United States Patent Office 3,322,740
Patented May 30, 1967

3,322,740
ALKYLENE OXIDE-POLYOL POLYETHER
MODIFIED ACETAL RESINS
Ben W. Kiff, Ona, and Joe T. Adams, St. Albans, W. Va.,
assignors to Union Carbide Corporation, a corporation
of New York
No Drawing. Filed July 25, 1963, Ser. No. 297,676
15 Claims. (Cl. 260—88.3)

The present invention is concerned with acetal resins formed from the reaction of acrolein and pentaerythritol. More particularly, the invention is concerned with the incorporation in such resins of an alkylene oxide-polyol polyether in an amount sufficient to improve the impact strength of the resin.

Resins formed from the reaction of acrolein with pentaerythritol in the presence of an acidic catalyst are well known in the art and are described in a number of publications, as for instance, U.S. Patents Nos. 2,687,407, 3,-022,273 and 3,087,918, the disclosure of such patents being incorporated herein by reference.

Thus, in one method of producing acrolein-pentaerythritol resins, acrolein and pentaerythritol are initially reacted under conditions producing diallylidene-pentaerythritol (i.e. 3,9-divinyl-2,4,8,10-tetroxaspirol[5,5]undecane) in a high yield. A liquid resin is then formed by the reaction of diallylidene-pentaerythritol with pentaerythritol in contact with a catalytic amount of an acidic catalyst at a temperature of from about 110° C. to about 180° C., and preferably from about 130° C. to about 150° C. The liquid resin thereby formed will slowly condense to a solid product. However, if the catalyst is neutralized with an alkaline material or otherwise eliminated in some manner, such as by distillation or filtration, etc., the liquid resin can be stored for a prolonged period of time. When it is desired to produce a cured solid from the liquid resin, an acidic catalyst is again incorporated therein if the catalyst was previously neutralized or eliminated as described above. It is then expedient to heat the liquid resin at a temperature within the range hereinabove described for a period of time sufficient to effect a cure. The heating period required to produce or cure the liquid resin can vary broadly, generally from about 10 minutes or less, up to about 24 hours or more, and will depend, for instance, upon the particular temperature, the identity and amount of catalyst employed, the viscosity for the liquid resin, or degree of cure, desired, etc. Hence, the heating period can readily be determined by one skilled in the art.

Many acid or acid-reacting substances have heretofore been employed as acidic catalysts in the production of acrolein-pentaerythritol resins as hereinabove described, among which there can be mentioned, by way of illustration, phosphoric acid, the acid-activated sub-bentonite clays, such as those described in the Encyclopedia of Chemical Technology, vol. 4, pp. 53–57 (1949), diethyl sulfate, pentaerythritol tetrasulfate, etc. Certain of these, such as the acid-activated sub-bentonite clays, are particularly useful for the production of liquid resins, since they can readily and conveniently be removed from the liquid resin, when desired, by filtration. A commercially available acid-activated sub-bentonite clay found to be especially effective is sold under the name of "Super Filtrol." Still other acidic catalysts, such as sulfuric acid, toluenesulfonic acid, benzenesulfonic acid, alkanesulfonic acids, boron trifluoride, etc., are useful principally in curing the liquid resin. The amount of catalyst required to produce or cure the liquid resin, like the heating period, can also vary broadly, generally from about 0.1 percent to about 10 percent by weight or more, based upon the total weight of the reactants, and is readily determined by one skilled in the art.

The cured resins produced as described above have many desired properties, such as hardness, clarity and resistance to chemicals, etc. It has now been found that the impact strength of the cured resins can be materially enhanced by the incorporation therein of a minor amount of a high average molecular weight polyether adduct (i.e. reaction product) of a lower alkylene oxide and a saturated aliphatic polyol as hereinbelow described. By virtue of their improved impact strength, the modified resins of this invention are eminently suited for use in applications in which shock-resistance is of significant importance, such as in the manufacture of bowling pins, tool handles, and the like.

The alkylene oxide-polyol polyethers contemplated as modifiers for acrolein-pentaerythritol resins in accordance with this invention are, in themselves, known to the art, and can be obtained by the reaction of at least one lower alkylene oxide, and preferably a 1,2-alkylene oxide, of from 2 to 4 carbon atoms, such as ethylene oxide, 1,2-propylene oxide, 1,3-butylene oxide or 1,2-butylene oxide, etc., or a mixture thereof, with a saturated aliphatic polyol containing from 3 to about 12 carbon atoms and preferably from 3 to 6 carbon atoms, and from 3 to about 8 hydroxyl groups and preferably from 3 to 6 hydroxyl groups per molecule. The preferred saturated aliphatic polyols are those consisting of carbon, hydrogen, and oxygen atoms and which are free from functional groups other than hydroxyl groups and ether linkages. As typical of the saturated aliphatic polyols which can be reacted with a lower alkylene oxide to produce the alkylene oxide-polyol polyethers contemplated by this invention there can be mentioned glycerol, 1,2,6-hexanetriol, trimethylolethane, trimethylolpropane, pentaerythritol, and the like. Also included among the saturated aliphatic polyols are the polyol-ethers such as sucrose, glucose, and the like.

The reaction between the alkylene oxide and the polyol is generally carried out in the presence of a catalyst, at a temperature of from about 100° C. to about 170° C., and under atmospheric or superatmospheric pressure. The reaction product thereby formed is a mixture of hydroxy poly(alkyleneoxy) ethers of the polyol which are characterized by the presence, in their molecular structure, of at least one hydroxyl-terminated poly(alkyleneoxy) chain attached to the polyol backbone. The product mixture may be used as such to improve the impact strength of acrolein-pentaerythritol resins or initially refined to obtain a purified product for subsequent use, as herein described.

Suitable catalysts for the reaction of alkylene oxide with the polyol include acidic and alkaline catalysts, such as boron trifluoride ethereate, potassium hydroxide, sodium acetate, trimethylamine, triethylamine, tripropylamine, etc. The amount of catalyst employed can vary broadly, generally varying in the range of from about 0.002 percent to about 2 percent by weight or more based upon the total weight of the reactants.

In particular, the alkylene oxide-polyol polyethers which are useful in accordance with this invention are the high average molecular weight products having a hydroxyl number of from about 200 to about 800, and preferably from about 400 to about 600. The use of alkylene oxide-polyol polyethers having a substantially higher hydroxyl number frequently gives rise to resins which are excessively hard and stiff or inflexible, while the use of alkylene oxide-polyol polyethers having a substantially lower hydroxyl number, on the other hand, ordinarily gives rise to resins which are unduly soft and unsuited for the applications hereinabove described. Thus, the amount of alkylene oxide reacted with the polyol to produce alkylene oxide-polyol polyethers which are useful in accordance with this invention will generally vary in the range of from about 6 to about 12 moles of alkylene oxide per mole of polyol.

The structure of the alkylene oxide-polyol polyethers contemplated by this invention can be illustrated further in connection with the formula of a representative member, viz an alkylene oxide-sorbitol polyether, as follows:

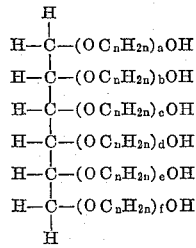

wherein each $n$, independently designates an integer of from 2 to 4, and $a$, $b$, $c$, $d$, $e$, and $f$ designate integers of from 0 to a positive value, the sum of which is such that the alkylene oxide-sorbitol polyether has an average molecular weight corresponding to a hydroxyl number of from about 200 to about 800, and preferably from about 400 to about 600.

As is known to the art, the hydroxyl number, upon which the molecular weight of the alkylene oxide-polyol polyether is based, is a measure of and proportional to the hydroxyl concentration per unit weight of the alkylene oxide-polyol polyether. Specifically, the hydroxyl number is defined in terms of milligram equivalents of potassium hydroxide per gram of the alkylene oxide-polyol polyether and is determined by the reaction of the alkylene oxide-polyol polyether with phthalic anhydride in accordance with conventional analytical procedure. The hydroxyl number is expressed as the number of milligrams of potassium hydroxide equivalent to the amount of phthalic anhydride consumed by reaction with one gram of the alkylene oxide-polyol polyether. The molecular weight of the alkylene oxide-polyol polyether can be calculated from the hydroxyl number according to the formula:

$$M.W. = \frac{56.1 \times 1000 \times f}{\text{Hydroxyl No.}}$$

wherein $f$ is the functionality of the alkylene oxide-polyol polyether, which, for instance, in the case of an alkylene oxide-sorbitol polyether is 6, etc.

In producing the modified resins of this invention, the alkylene oxide-polyol polyether can be incorporated in the reaction mixture together with diallylidene-pentaerythritol, pentaerythritol and an acidic catalyst in connection with the production of the liquid resin. Alternatively, the liquid resin can be initially produced and the alkylene oxide-polyol polyether subsequently incorporated therein, after which the resulting liquid resinous mixture is cured in the presence of an acidic catalyst.

In either procedure, the amount of alkylene oxide-polyol polyether incorporated can vary broadly in the range of from about 10 percent to about 50 percent, and preferably from about 25 to about 40 percent, by weight, based upon the total weight of the reactants. Similar to the effect of low hydroxyl number, the use of alkylene oxide-polyol polyethers in substantially higher concentrations ordinarily gives rise to resins which are unduly soft and unsuited for the applications hereinabove described, while the use of substantially lower concentrations does not materially enhance the impact strength of the resins.

Moreover, for reaction with the alkylene oxide-polyol polyether, it is essential that the amount of diallylidene-pentaerythritol employed be in excess of the stoichiometric amount required to react with the amount of pentaerythritol employed in producing the liquid resin. Considering the amount of alkylene oxide-polyol polyether to be incorporated, as described above, good results can be obtained employing from about 2.5 to about 8 moles, and preferably from about 3 to about 6 moles, of diallylidene-pentaerythritol per mole of pentaerythritol in producing the liquid resin. The reaction conditions employed in producing and curing the liquid resin, incorporating the alkylene oxide-polyol polyether, are as otherwise described above.

The practice of the present invention and the advantages concomitant therewith are illustrated by the following examples, but in no way limited thereto. In connection with the examples, the following definitions are made. Hardnes is defined in terms of Shore "D" hardness determined using a Shore testing machine. Impact strength is defined in terms of pounds per inch of drop determined using a Gardner Bump Tester. Alkylene oxide-polyol polyether "A" is a 1,2-propylene oxide-sorbitol polyether having a hydroxyl number of 490 and an average molecular weight of about 630.

*Example 1*

In a reactor, 436 g. of diallylidene-pentaerythritol and 70 g. of pentaerythritol were heated with 5.06 g. of Super Filtrol at a temperature maintained in the range of 143° C. to 152° C. for a period of 5 hours. During the reaction, the reaction mixture was stirred to maintain suspension of the catalyst. At the conclusion of the reaction period, the reaction mixture was cooled to a temperature of 50° C. and 250 ml. of acetone were added thereto. The catalyst (Super Filtrol) was removed by filtration and the acetone was distilled off to a kettle temperature of 83° C./4 mm. of Hg. The resulting liquid resin residue was straw-colored and of low viscosity. To 50 g. of this liquid resin there was added 0.7 cc. of 4.6% boron trifluoride in ethyl ether. The resulting mixture was poured into molds and cured at a temperature of 125° C. for a period of 8 hours. A plaque of the cured resin had a hardness of 85 and an impact strength of 3 inch/lbs.

*Example 2*

To a stirred reactor there were charged 2496 g. of diallylidene-pentaerythritol, 544 g. of pentaerythritol, 1100 g. of alkylene oxide-polyol polyether "A" and 125 g. of Super Filtrol. The reaction mixture was heated at a temperature maintained in the range of 143° C. to 150° C. for a period of 55 minutes. At the conclusion of the reaction period, the reaction mixture was cooled to a temperature of 50° C., diluted with acetone, and filtered to remove the catalyst (Super Filtrol). The acetone was then distilled off to a kettle temperature of 120° C./5 mm. of Hg. To a portion of the liquid resin residue 0.2% by weight of sulfate was added. The resulting mixture was thereafter poured into molds and cured at a temperature of 100° C. for a period of 3 hours. A plaque of the cured resin had a hardness of 63 and an impact strength of 18 inch/lbs.

*Example 3*

To a stirred reactor there were charged 312 g. of diallylidene-pentaerythritol, 68 g. of pentaerythritol, 150 g. of alkylene oxide-polyol polyether "A" and 15.4 g. of Super Filtrol. The reaction mixture was heated at a temperature maintained in the range of 141° C. to 152° C. for a period of 1.5 hours. At the conclusion of the reaction period, the reaction mixture was cooled to a temperature of 50° C., diluted with acetone, and filtered to remove the catalyst (Super Filtrol). The acetone was then distilled off to a kettle temperature of 140° C./10 mm. of Hg. To a portion of the liquid resin residue 0.2% by weight of diethyl sulfate was added. The resulting mixture was thereafter poured into molds and cured at a temperature of 125° C. for a period of 3 hours. A plaque of the cured resin had a hardness of 73 and an impact strength of 53 inch/lbs.

*Example 4*

To a stirred reactor there were charged 2496 g. of diallylidene-pentaerythritol, 544 g. of pentaerythritol, 1650 g. of alkylene oxide-polyol polyether "A," and 123 g. of Super Filtrol. The reaction mixture was heated at a temperature maintained in the range of 140° C. to 148° C. for a period of 50 minutes. At the conclusion of the reaction period, the reaction mixture was cooled to a temperature of 50° C., diluted with acetone, and filtered to remove the catalyst (Super Filtrol). The acetone was distilled off to a kettle temperature of 120° C./10 mm. of Hg. To a portion of the liquid resin residue 0.2% by weight of diethyl sulfate was added. The resulting mixture was thereafter poured into molds and cured at a temperature of 125° C. for a period of 3 hours. A plaque of the cured resin had a hardness of 57 and an impact strength of 320 inch/lbs.

*Example 5*

To a stirred reactor there were charged 2496 g. of diallylidene-pentaerythritol, 544 g. of pentaerythritol, 1850 g. of alkylene oxide-sorbitol polyether "A," and 149 g. of Super Filtrol. The reaction mixture was heated at a temperature maintained in the range of 140° C. to 146° C. for a period of 45 minutes. At the conclusion of the reaction period, the reaction mixture was cooled to a temperature of 50° C.. diluted with acetone, and filtered to remove the catalyst (Super Filtrol). The acetone was then distilled off to a kettle temperature of 120° C./5 mm. of Hg. To a portion of the liquid resin residue, 0.2% diethyl sulfate was added. The resulting mixture was thereafter poured into molds and cured at a temperature of 125° C. for a period of 3 hours. A plaque of the cured resin had a hardness of 37 and an impact strength of 480 inch/lbs. In like manner, the impact strength of diallylidene-pentaerythritol resins is materially enhanced by the incorporation of 1,2-ethylene oxide-glucose, 1,2-propylene oxide-1,2,6-hexanetriol, 1,2-butylene oxide-glycerol, and mixed (50:50 by weight) 1,2-ethylene oxide-1,2-propylene oxide-trimethylolpropane polyethers of similar hydroxyl number.

*Example 6*

To a stirred reactor there were charged 212 g. of diallylidene-pentaerythritol, 34 g. of pentaerythritol, 158 g. of alkylene oxide-sorbitol polyether "A," and 12 g. of Super Filtrol. The reaction mixture was heated at a temperature maintained in the range of 140° C. to 146° C. for a period of 50 minutes. At the conclusion of the reaction period, the reaction mixture was cooled to a temperature of 50° C., diluted with acetone, and filtered to remove the catalyst (Super Filtrol). The acetone was then distilled off to a kettle temperature of 130° C./5 mm. of Hg. To a portion of the liquid resin residue, 0.2% diethyl sulfate was added. The resulting mixture was thereafter poured into molds and cured at a temperature of 125° C. for a period of 3 hours. A plaque of the cured resin had a hardness of 33 and an impact strength of 480 inch/lbs.

What is claimed is:

1. The resinous heat reaction product of diallylidene-pentaerythritol, pentaerythritol, and the polyether adduct of a lower alkylene oxide and a saturated aliphatic polyol containing from 3 to 12 carbon atoms and from 3 to 8 hydroxyl groups per molecule, said polyether having a hydroxyl number of from about 200 to about 800, the proportion of diallylidene-pentaerythritol to pentaerythritol being in the range of from about 2.5 to about 8 moles of diallylidene-pentaerythritol per mole of pentaerythritol, and the proportion of said polyether being in the range of from about 10 to about 50 percent by weight based upon the total weight of the reactants.

2. The resinous heat reaction product of diallylidene-pentaerythritol, pentaerythritol, and the polyether adduct of a lower alkylene oxide and a saturated aliphatic polyol containing from 3 to 6 carbon atoms and from 3 to 6 hydroxyl groups per molecule, said polyether having a hydroxyl number of from about 400 to about 600, the proportion of diallylidene-pentaerythritol to pentaerythritol being in the range of from about 3 to 6 moles of diallylidene-pentaerythritol per mole of pentaerythritol, and the proportion of said polyether being in the range of from about 25 to about 40 percent by weight based upon the total weight of the reactants.

3. The resinous heat reaction product according to claim 2 wherein said lower alkylene oxide is 1,2-ethylene oxide.

4. The resinous heat reaction product according to claim 2 wherein said lower alkylene oxide is 1,2-propylene oxide.

5. The resinous heat reaction product according to claim 2 wherein said saturated aliphatic polyol is sorbitol.

6. The resinous heat reaction product according to claim 2 wherein said saturated aliphatic polyol is 1,2,6-hexanetriol.

7. The resinous heat reaction product according to claim 2 wherein said saturated alpihatic polyol is trimethylol propane.

8. A process for producing a resinous composition comprising heating in the presence of an acidic catalyst a mixture of (1) diallylidene-pentaerythritol, (2) pentaerythritol, and (3) a polyether adduct of a lower alkylene oxide and a saturated aliphatic polyol; said polyol containing from 3 to 12 carbon atoms and from 3 to 8 hydroxyl groups per molecule, said polyether having a hydroxyl number of from about 200 to about 800, the proportion of diallylidene-pentaerythritol to pentaerythritol being in the range of from about 2.5 to about 8 moles of diallylidene-pentaerythritol per mole of pentaerythritol, and the proportion of said polyether being in the range of from about 10 to about 50 percent by weight based upon the total weight of the reactants.

9. A process for producing a resinous composition comprising heating a liquid resin, produced by heating diallylidene-pentaerythritol and pentaerythritol in the presence of an acidic catalyst in a mole ratio of from about 2.5 to about 8 moles of diallylidene-pentaerythritol per mole of pentaerythritol, in admixture with from about 10 to about 50 percent by total weight of a polyether adduct of a lower alkylene oxide and a saturated aliphatic polyol containing from 3 to 12 carbon atoms and from 3 to 8 hydroxyl groups per molecule, said polyether having a hydroxyl number of from about 200 to about 800.

10. A process for producing a resinous composition comprising heating a liquid resin, produced by heating diallylidene-pentaerythritol and pentaerythritol in the presence of an acidic catalyst in a mole ratio of from about 3 to about 6 moles of diallylidene-pentaerythritol per mole of pentaerythritol, in admixture with from about 25 to about 40 percent by total weight of a polyether adduct of a lower alkylene oxide and a saturated aliphatic polyol containing from 3 to 6 carbon atoms and from 3 to 6 hydroxyl groups per molecule, said polyether having a hydroxyl number of from about 400 to about 600.

11. The process as claimed in claim 10 wherein said lower alkylene oxide is 1,2-ethylene oxide.

12. The process as claimed in claim 10 wherein said lower alkylene oxide is 1,2-propylene oxide.

13. The process as claimed in claim 10 wherein said saturated aliphatic polyol is sorbitol.

14. The process as claimed in claim 10 wherein said saturated aliphatic polyol is 1,2,6-hexanetriol.

15. The process as claimed in claim 10 wherein said saturated alpihatic polyol is trimethylolpropane.

References Cited

UNITED STATES PATENTS

| | | | |
|---|---|---|---|
| 2,555,169 | 5/1951 | Voorthuis | 260—45.8 |
| 2,687,407 | 8/1954 | Orth | 260—67 XR |
| 3,022,273 | 2/1962 | Guest et al. | 260—67 XR |
| 3,028,362 | 4/1962 | Zimmermann | 260—835 |

WILLIAM H. SHORT, *Primary Examiner.*

L. M. PHYNES, *Assistant Examiner.*